(No Model.)
J. E. WARREN.
FILTERING APPARATUS.
No. 454,817. Patented June 23, 1891.
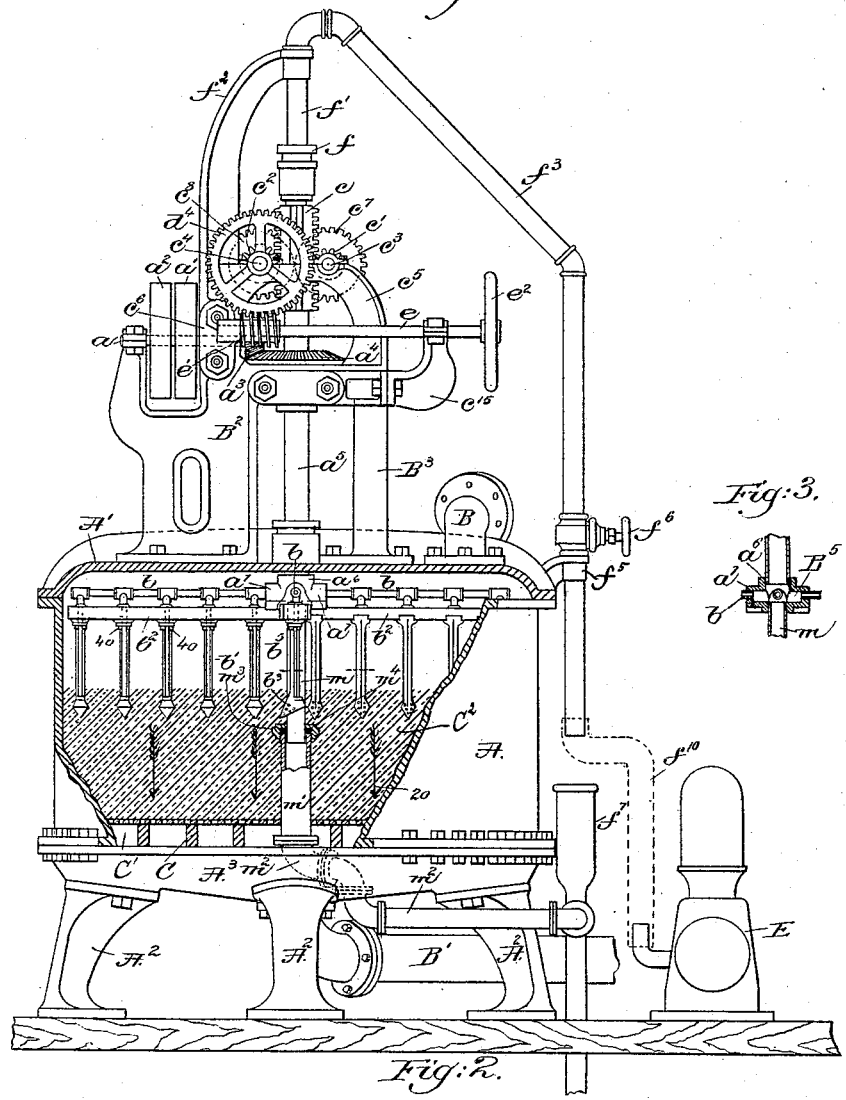
Witnesses.
Howard F. Eaton.
Fred L. Emery.
Inventor.
John E. Warren
by Crosby & Gregory
Attys.

UNITED STATES PATENT OFFICE.

JOHN E. WARREN, OF CUMBERLAND MILLS, ASSIGNOR TO THE CUMBERLAND MANUFACTURING CO. OF PORTLAND, MAINE.

FILTERING APPARATUS.

SPECIFICATION forming part of Letters Patent No. 454,817, dated June 23, 1891.

Application filed December 8, 1887. Serial No. 257,296. (No model.)

*To all whom it may concern:*

Be it known that I, JOHN E. WARREN, of Cumberland Mills, county of Cumberland, State of Maine, have invented an Improvement in Filtering Apparatus, of which the following description, in connection with the accompanying drawings, is a specification, like letters and figures on the drawings representing like parts.

This invention relates to filters and is an improvement upon the filter shown and described in United States Patent No. 332,979, granted to me December 22, 1885. In the patent referred to the filter is provided with an agitator consisting of cross-bars having depending teeth, the said cross-bars being secured to a vertical solid shaft, to which rotation is imparted by gearing. The shaft referred to has splined upon it a sleeve provided with racks which are engaged by pinions to impart a vertical movement to the said sleeve and shaft and thereby to the teeth on the cross-bars, thus causing the said teeth to be withdrawn from or entered to varying depths into the material composing the filtering-bed. By means of the agitator referred to the water resting upon the filtering-bed is whipped as the agitator is revolved, and the filtering material or bed is stirred up or agitated to permit the foul organic or sedimentary matter to be washed out, when the water or other fluid being filtered is caused to flow through the filter from its bottom toward its top—that is, in a reverse direction. To thus cleanse a filter, it is necessary to stop the process of filtering until the foul foreign matter has been removed.

It is the object of this invention to provide apparatus by which the foreign matter referred to may be removed during the process of filtering without stopping or in the least retarding the said process, thus enabling the filter to be used continuously.

The particular features of my invention will be pointed out in the claims at the end of this specification.

Figure 1 shows in elevation and section a filtering apparatus constructed in accordance with this invention, the cistern or tank being broken out to show the interior construction of the apparatus. Fig. 2 is a sectional detail to be referred to, the section being taken on line $x\ x$, Fig. 1; Fig. 3, a sectional detail of the fitting connecting the pipe $b$ with the exhaust-shaft.

The cistern or tank A may be of any convenient or desired capacity, it being herein shown as closed by the cover A' and having its bottom $A^3$ supported upon legs or standards $A^2$, the said cistern or tank being provided with the inlet-pipe B and outlet-pipe B'. The cistern or tank has a false bottom composed, as herein shown, of slats C, separated from one another, the said slats supporting, as shown, a perforated metal plate C', upon which rests the bed $C^2$ of filtering material, which may be any of the well-known substances employed for filtering purposes—such, for instance, as gravel, sand, charcoal, bone, &c.

The cistern A supports the standard or upright $B^2$, forming bearings for the shaft $a$, having mounted thereon the fast and loose pulleys $a'\ a^2$, respectively, and the said shaft is provided at its end with the pinion $a^3$, meshing with the gear $a^4$, secured to the shaft $a^5$, substantially as in the patent referred to. The shaft $a^5$ in the present instance is hollow, and at its lower end within the cistern A the said hollow shaft is provided with a fitting $a^6$, having radial arms $a^7$, herein shown at right angles to each other, the said fitting constituting a chamber $B^5$ (see Fig. 3) to receive slime or sediment, as will be described. Each arm $a^7$ has fitted to it a pipe $b$, and each pipe $b$ has, as shown, a series of independent branch pipes $b'$, which are shown by dotted line, Fig. 1, as extended through a beam $b^2$, located below and substantially in line with the pipe $b$. Each depending branch pipe $b'$, as herein shown, has co-operating with it a strengthening rib or bar $b^5$, fastened, as shown, by bolts 40 to the beam $b^2$, the said rib or bar having an enlarged hollow foot portion $b^3$, constituting a chamber into which the lower end of the branch pipe $b'$ is fitted. The sides of the enlarged foot portion or chamber are provided with perforations $b^4$ for a purpose to be described, the said foot portion and pipe $b'$ connected therewith being best shown in Fig. 2.

The hollow shaft $a^5$ has secured to it by a spline connection a sleeve $c$, provided at opposite sides with racks which are engaged by pinions $c'\ c^2$ on shafts $c^3\ c^4$, respectively, supported in brackets $c^5$ $c^6$, the said shafts also having the gears $c^7$ $c^8$, as in the patent referred to. The shaft $c^4$ has mounted on it a worm-gear $d$ in engagement with a worm $e'$ on a spindle $e$, having bearings in brackets $c^{15}$ $c^6$, secured, respectively, to the uprights $B^3$ $B^2$, the said shafts also having the hand-wheel $e^2$.

The hollow shaft $a^5$ is provided at its upper extremity with a stuffing box or gland $f$, into which is fitted the end of a stationary pipe $f'$, supported in an arm $f^2$ of the bracket $c^6$, the said stationary pipe above the said arm being connected to a pipe $f^3$, provided with a valve $f^6$, the said pipe $f^3$ being shown as supported by a bracket $f^5$ and adapted to discharge into a larger pipe $f^7$.

In the operation of my improved filter as thus far described the water or other fluid to be purified is discharged into the cistern A through the inlet-pipe, the said fluid percolating through the filtering-bed and flowing from the said cistern through the outlet B.'

In the process of filtration the surface or upper layer of the filtering-bed receives and retains all or the greater part of foreign or impure matter contained in the fluid to be filtered. This foreign or impure matter exists principally in the form of a slimy sediment resting upon or loosely held by the surface of the filtering-bed.

In accordance with my invention the slimy sedimentary matter referred to may be removed without necessitating the stopping of the filtering process by means of a suction engine or pump E, connected, as shown in dotted lines, by pipe $f^{10}$ to the mouth of the pipe $f^3$, by which fluid is drawn up through the pipes $b'$ and $b^2$ and hollow shaft $a^5$, and thence through the pipes $f^8$ $f^{10}$ and pump E, it being discharged from the said pump into the pond from which it is taken or into any other desirable receptacle, or it may be permitted to run to waste, the fluid and slimy matter passing from the cistern into the pipes $b'$ through the perforations $b^4$ in the walls of the foot or chamber $b^3$.

Instead of employing the pump E, the internal pressure of the water upon the filtering-bed in the covered tank A may be depended upon to force the fluid containing the sedimentary matter up the hollow shaft $a^5$, from which it is discharged into the pipe $f^7$, connected, it may be, with any suitable reservoir or receptacle.

It will be noticed that the process of removing the slimy matter is supposed to take place with the agitator at rest; but it is evident that the said process may, and in practice will mainly, take place while the said agitator is being revolved and at the same time made to travel in a vertical path within a limited range.

When it is desired to rotate the hollow shaft $a^5$, a belt (not shown) is slipped from the loose pulley $a^2$ to the fast pulley $a'$, thereby rotating the shaft $a$ and pinion $a^3$, the latter rotating the gear $a^4$ and hollow shaft $a^5$.

The agitating device may be raised or lowered from above or near the surface to near the bottom C' by turning the hand-wheel $e^2$, causing the sleeve $c$ to be moved up or down through the gearing described.

While the slimy matter is being removed, as shown in the drawings, the process of filtering is going on, as indicated by the arrows 20.

A filter constructed as described and provided with the hollow exhaust-shaft $a^5$ is adapted to be conveyed from one place to another and is known as a "portable filter."

In some instances when it is desired to permanently locate the filter in one place the tank A will preferably be open at its top and made of sufficient size to retain a considerable head of water. In this case the shaft $a^5$ will preferably be made solid, as in my patent referred to; but it may be hollow, as herein shown, and the fitting $a^6$ has connected to it, as shown by full lines, Figs. 1 and 3, a hollow shaft or plunger $m$, extended downward in the tank A and into a pipe or hollow standard $m'$. The pipe or hollow standard $m'$ may be supported from the bottom of the tank A in any suitable manner, and the said pipe or hollow standard has connected to it a pipe $m^2$, herein shown as discharging into the pipe $f^7$. The pipe or hollow standard $m'$ is provided, as shown, with a cap $m^3$, through which the exhaust pipe or plunger $m$ is extended, a substantially water-tight joint being effected by means of a packing $m^4$.

When the exhaust shaft or plunger $m$ is used, the pressure of the head of water in the tank alone may be depended upon to force the slime or sedimentary matter into the chamber $B^5$ of the fitting $a^6$, the said slime or sedimentary matter passing from said chamber through the exhaust shaft or plunger $m$, hollow standard $m'$, and pipe $m^2$ into the waste-pipe $f^7$.

If desired, the pump E may be connected to the pipe $m^2$ and suction employed to withdraw the slime from the filter-bed.

The method of filtering herein described is not herein claimed, as it forms the subject-matter of United States Patent No. 379,349, granted to me March 13, 1888.

I claim—

1. In a filtering apparatus, the combination, with a tank or vessel provided with an inlet through which to supply the tank with water and with an outlet for the filtered water, of an independent hollow exhaust shaft or plunger extending up through the filter-bed, a pipe $b$, connected therewith and located in said tank, a series of branch pipes having perforated feet, as $b^3$, and a pump connected to said exhaust-pipe and by means of which the slime or other sedimentary matter is drawn off from the filter in a direction opposite to the flow of the liquid through the filter-bed, substantially as described.

2. In a filtering apparatus, the combination, with a tank or vessel provided with an inlet through which to supply the tank with water and with an outlet for the filtered water, of an independent hollow exhaust shaft or plunger extending up through the filter-bed, means, substantially as described, to raise and lower the said exhaust-shaft, a pipe $b$, connected therewith and located in said tank, a series of branch pipes having perforated feet, as $b^3$, and a pump connected to said exhaust-pipe and by means of which the slime or sedimentary matter is drawn off from the filter in a direction opposite to the flow of the liquid through the filter-bed, substantially as described.

3. In a filtering apparatus, a tank or vessel, a hollow shaft or plunger, and one or more pipes connected therewith and located in said tank, combined with branch pipes connected to the said pipes and provided with a foot portion having perforations to admit of the passage of slime or other sedimentary matter into the said branch pipes, and with strengthening-ribs for said branch pipes, substantially as described.

4. In a filtering apparatus, a tank or vessel, an inlet B and outlet-pipe B′, connected thereto, and a branch pipe provided with an enlarged foot portion having perforations to admit of the passage of slime or other sedimentary matter into the said branch pipe, and a strengthening-rib $b^5$, combined with an independent exhaust-pipe connected to the said branch pipe and communicating with the outside of the vessel or tank, substantially as described.

5. In a filtering apparatus, the combination, with a tank or vessel provided with an inlet through which to supply the tank with water and having an outlet for the filtered water, of an independent hollow exhaust shaft or plunger, a fitting $a^6$, connected thereto, a series of pipes $b$, connected to said fitting, a series of branch pipes connected to the pipes $b$, and a hollow standard $m'$, into which the exhaust-pipe is extended, substantially as described.

In testimony whereof I have signed my name to this specification in the presence of two subscribing witnesses.

JOHN E. WARREN.

Witnesses:
W. E. AYER,
FRED. A. VENILL.